US010575171B2

(12) United States Patent
Goto

(10) Patent No.: US 10,575,171 B2
(45) Date of Patent: Feb. 25, 2020

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 179 days.

(21) Appl. No.: 15/412,619

(22) Filed: Jan. 23, 2017

(65) Prior Publication Data

US 2017/0215067 A1    Jul. 27, 2017

(30) Foreign Application Priority Data

Jan. 26, 2016 (JP) ................................. 2016-012863

(51) Int. Cl.

| H04L 29/06 | (2006.01) |
| H04W 12/04 | (2009.01) |
| H04W 12/06 | (2009.01) |
| H04W 76/11 | (2018.01) |
| H04W 12/00 | (2009.01) |
| H04W 48/16 | (2009.01) |
| H04W 12/02 | (2009.01) |

(52) U.S. Cl.
CPC ......... *H04W 12/04* (2013.01); *H04W 12/003* (2019.01); *H04W 12/06* (2013.01); *H04W 76/11* (2018.02); *H04L 63/061* (2013.01); *H04W 12/00516* (2019.01); *H04W 12/00522* (2019.01); *H04W 12/02* (2013.01); *H04W 48/16* (2013.01)

(58) Field of Classification Search
None
See application file for complete search history.

(56) References Cited

U.S. PATENT DOCUMENTS

| 8,935,777 | B2 * | 1/2015 | DeSoto | ................ | H04W 12/06 726/18 |
| 2006/0208088 | A1 * | 9/2006 | Sekiguchi | ............ | G06K 7/1095 235/472.02 |
| 2006/0239513 | A1 * | 10/2006 | Song | .................... | G06F 21/6254 382/115 |
| 2009/0092060 | A1 * | 4/2009 | Goto | ................... | H04L 63/0428 370/254 |
| 2010/0262828 | A1 * | 10/2010 | Brown | ................. | H04L 9/0844 713/171 |
| 2010/0278343 | A1 * | 11/2010 | Goto | .................... | H04L 63/061 380/270 |

(Continued)

FOREIGN PATENT DOCUMENTS

| JP | 2006-285826 A | 10/2006 |
| JP | 2007-043317 A | 2/2007 |

(Continued)

*Primary Examiner* — Maung T Lwin
(74) *Attorney, Agent, or Firm* — Canon U.S.A, Inc., IP Division

(57) ABSTRACT

A communication apparatus receives information encrypted based on encryption information obtained by capturing an image of code information about the communication information from a different communication apparatus operating as an access point to form a wireless network. The communication apparatus and the different communication apparatus perform encrypted communication based on the information.

9 Claims, 6 Drawing Sheets

(56) References Cited

U.S. PATENT DOCUMENTS

| | | | | |
|---|---|---|---|---|
| 2012/0124365 A1* | 5/2012 | Black | G07F 7/00 | 713/150 |
| 2013/0016710 A1* | 1/2013 | Shinohara | H04M 1/7253 | 370/338 |
| 2013/0219479 A1* | 8/2013 | DeSoto | H04W 12/06 | 726/6 |
| 2013/0223279 A1* | 8/2013 | Tinnakornsrisuphap | H04L 41/0809 | 370/254 |
| 2014/0115674 A1* | 4/2014 | Fukushima | H04W 12/04 | 726/5 |
| 2014/0351589 A1* | 11/2014 | Chenna | H04L 63/0823 | 713/168 |
| 2016/0173505 A1* | 6/2016 | Ichihara | H04L 63/123 | 713/170 |
| 2016/0212617 A1* | 7/2016 | Koshimizu | H04L 9/0844 | |
| 2017/0033937 A1* | 2/2017 | Yazdha | H04W 12/08 | |

FOREIGN PATENT DOCUMENTS

| | | |
|---|---|---|
| JP | 2008-113133 A | 5/2008 |
| JP | 2011-055127 A | 3/2011 |
| JP | 2012-054743 A | 3/2012 |
| JP | 2013-059129 A | 3/2013 |
| JP | 2014-60623 A | 4/2014 |
| JP | 2014-082717 A | 5/2014 |
| JP | 2014-168215 A | 9/2014 |
| WO | 11/132761 A1 | 10/2011 |

* cited by examiner

COMMUNICATION APPARATUS, COMMUNICATION METHOD, AND STORAGE MEDIUM

BACKGROUND

Field

The present disclosure relates to a communication technology.

Description of the Related Art

In recent years, more and more electronic apparatuses, such as a digital camera, a printer, a mobile phone, and a smartphone, are equipped with a wireless communication function and used in connection with a wireless network.

To connect an electronic apparatus to a wireless network, various communication parameters need to be set. Examples of the communication parameters include an encryption method, an encryption key, an authentication method, and an authentication key. Japanese Patent Application Laid-Open No. 2014-60623 discusses a technique for facilitating the setting of such communication parameters. According to Japanese Patent Application Laid-Open No. 2014-60623, an electronic apparatus displays a Quick Response (QR) Code® representing communication parameters. A mobile terminal reads the QR Code® by imaging, and sets the read communication parameters to an access point.

Japanese Patent Application Laid-Open No. 2006-285826 discusses an approach to enhancing security during exchange of communication parameters. According to Japanese Patent Application Laid-Open No. 2006-285826, an access point that forms a network transmits communication parameters that are encrypted based on a public key obtained from a wireless tag.

As discussed in the foregoing Japanese Patent Application Laid-Open No. 2014-60623, setting the communication parameters by using the imaging of code information that encodes a lot of information, like a two-dimensional code, can reduce complicated user inputs. If the code information includes information for encrypting the communication parameters such as a public key, the communication parameters encrypted as discussed in Japanese Patent Application Laid-Open No. 2006-285826 can be shared between the apparatus that performs the imaging and the apparatus that displays the code information.

If the sharing of the encryption information between the apparatuses by imaging of the code information is applied to the technique discussed in Japanese Patent Application Laid-Open No. 2006-285826, the apparatus that forms a network needs to have an imaging function. However, apparatuses that form a network do not necessarily have an imaging function.

SUMMARY

According to an aspect of the present invention, a communication apparatus includes a forming unit configured to operate as an access point and form a wireless network having a first network identifier, a provision unit configured to provide a first communication parameter relating to the wireless network having the first network identifier, the first communication parameter including at least any one of the first network identifier, an encryption method, or an authentication method, a reception unit configured to receive a second communication parameter for performing encrypted communication over the wireless network having the first network identifier from a different first communication apparatus having obtained the provided first communication parameter, the second communication parameter being encrypted by using encryption information obtained from a captured image corresponding to the communication apparatus, and a communication unit configured to perform the encrypted communication based on the received second communication parameter over the wireless network having the first network identifier.

According to another aspect of the present invention, a communication apparatus includes a first acquisition unit configured to acquire a first communication parameter relating to a wireless network having a first network identifier from a different communication apparatus serving as an access point and forming the wireless network having the first network identifier, the first communication parameter including at least any one of the first network identifier, an encryption method, or an authentication method, a second acquisition unit configured to acquire encryption information from a captured image corresponding to the different communication apparatus, a transmission unit configured to transmit a second communication parameter for performing encrypted communication over the wireless network having the first network identifier to the different communication apparatus identified by the acquired first communication parameter, the second communication parameter being encrypted using the encryption information acquired by the second acquisition unit; and a communication unit configured to perform the encrypted communication, based on the second communication parameter transmitted by the transmission unit, over the wireless network having the first network identifier.

Further features will become apparent from the following description of exemplary embodiments with reference to the attached drawings.

DESCRIPTION OF THE EMBODIMENTS

In a first exemplary embodiment, information for connecting to a network is shared between apparatuses by using encryption information expressed by code information even if an apparatus that forms the network does not have an imaging function.

A communication apparatus according to the present exemplary embodiment will be described in detail below with reference to the drawings. In the following example, a wireless local area network (LAN) system compliant with the Institute of Electrical and Electronics Engineers (IEEE) 802.11 series is used to describe the present exemplary embodiment. However, the communication format is not necessarily limited to an IEEE 802.11-compliant wireless LAN. For example, the present exemplary embodiment is applicable to communication apparatuses compliant with other wireless communication methods such as Bluetooth®, near field communication (NFC), and ZigBee. The present exemplary embodiment is also applicable to communication apparatuses compliant with wired communication methods such as a wired LAN.

Figure 3:
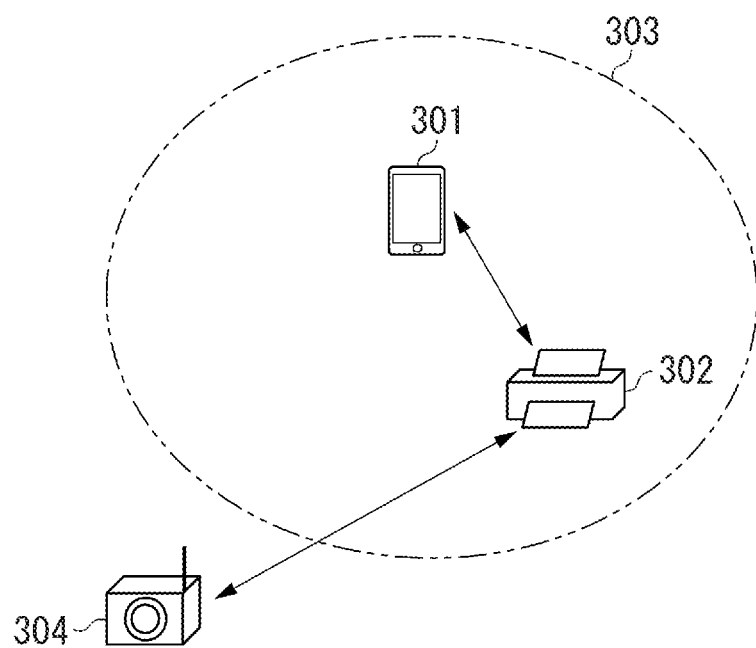
FIG. 3 is a diagram schematically illustrating a configuration of a communication system.

FIG. 3 is a diagram illustrating a configuration of a communication system according to the present exemplary embodiment. The communication system includes a smartphone 301, a printer 302, and a camera 304. Hereinbelow, processing performed when the camera 304 joins a wireless network 303 (hereinbelow, network) formed by the printer 302 will be described below.

In the present exemplary embodiment, the printer 302 operates as an access point in the infrastructure mode defined in the IEEE 802.11 standard. The other apparatuses operate as stations (STAs) in the infrastructure mode defined in the IEEE 802.11 standard. The network 303 can be formed with the printer 302 as a Wi-Fi Direct® group owner, and the smartphone 301 and the camera 304 as Wi-Fi Direct® clients.

While the apparatuses in the communication system according to the present exemplary embodiment are described to be a smartphone, a camera, and a printer, other apparatuses can be used. Examples include a mobile phone, a personal computer (PC), a video camera, a smartwatch, and a personal digital assistant (PDA). Although the communication system is described to include three apparatuses, two, four, or more apparatuses can be included.

Figure 1:
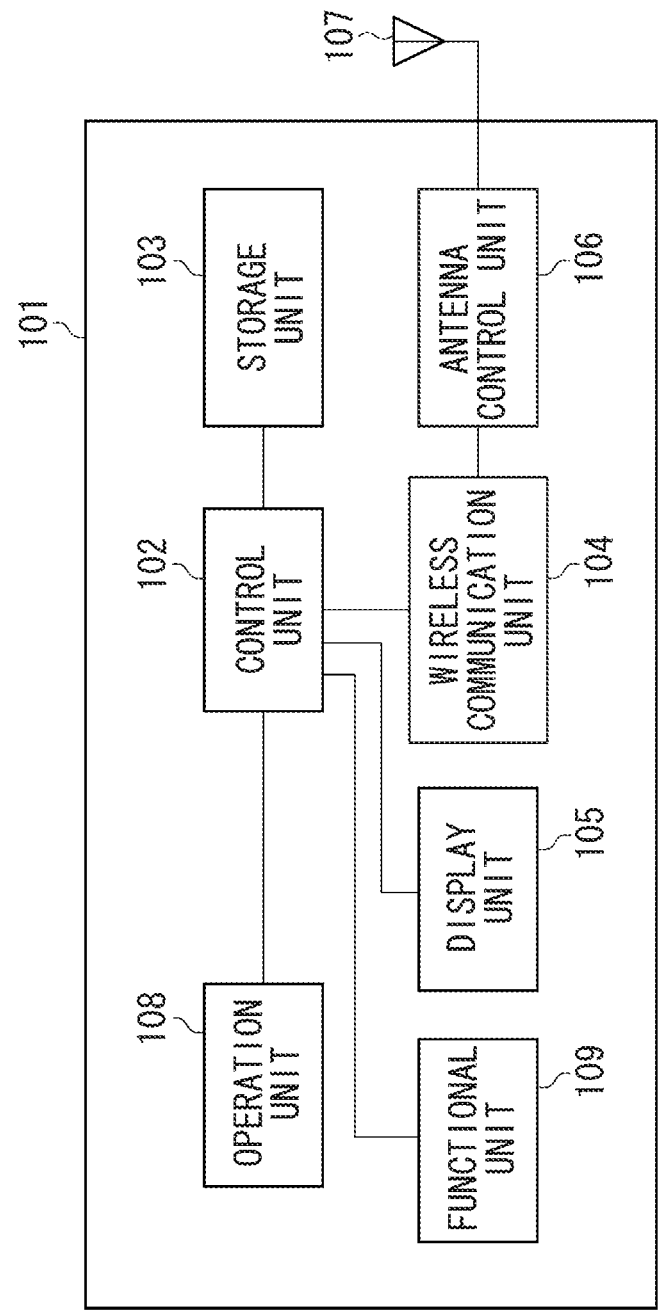
FIG. 1 is a block diagram illustrating a hardware configuration of a communication apparatus.

Next, a hardware configuration of the communication apparatuses (smartphone 301, camera 304, and printer 302) in the communication system illustrated in FIG. 3 will be described with reference to FIG. 1. FIG. 1 illustrates a hardware block configuration of a communication apparatus 101. A control unit 102 includes a central processing unit (CPU) or microprocessing unit (MPU), and executes programs stored in a storage unit 103 to control the communication apparatus 101. The control unit 102 can control the communication apparatus 101 in cooperation with an operating system (OS) running on the control unit 102. The control unit 102 also performs control to communicate and share communication parameters with other communication apparatuses.

The storage unit 103 includes a read-only memory (ROM) and a random access memory (RAM). The storage unit 103 stores a program for performing various operations, described below, and various types of information such as communication parameters used for wireless communication. The various operations described below are implemented by the control unit 102 executing a control program stored in the storage unit 103. Other than the ROM and RAM, storage media such as a flexible disk, a hard disk, an optical disk, a magneto-optical disk, a compact disc read only memory (CD-ROM), a compact disc-recordable (CD-R), a magnetic tape, a nonvolatile memory card, and a digital versatile disc (DVD) can be used as the storage unit 103.

A wireless communication unit 104 performs wireless communication, such as that of a wireless LAN compliant with the IEEE 802.11 series. For example, the wireless communication unit 104 is can be a chip intended for communication. The wireless communication unit 104 can include hardware for performing short-range wireless communications other than the wireless LAN. Examples of the short-range wireless communications include Bluetooth® and NFC. A display unit 105 is a display unit for performing various types of display control. The display unit 105 can be a liquid crystal display (LCD) or light-emitting diode (LED) that include functions of outputting visually perceivable information and in some instances can output sound. The display unit 105 includes a function of outputting at least one of visual information and sound information.

An antenna control unit 106 and an antenna 107 perform wireless communication. An operation unit 108 is an operation unit from which a user can provide various inputs to operate the communication apparatus 101. A functional unit 109 is hardware for the communication apparatus 101 to perform predetermined processing. For example, if the communication apparatus 101 is the smartphone 301 or the camera 304, the functional unit 109 is an imaging unit. The imaging unit includes an image sensor and a lens, and captures still images and moving images. For example, if the communication apparatus 101 is the printer 302, the functional unit 109 is a print unit. The print unit performs print processing.

Figure 2:
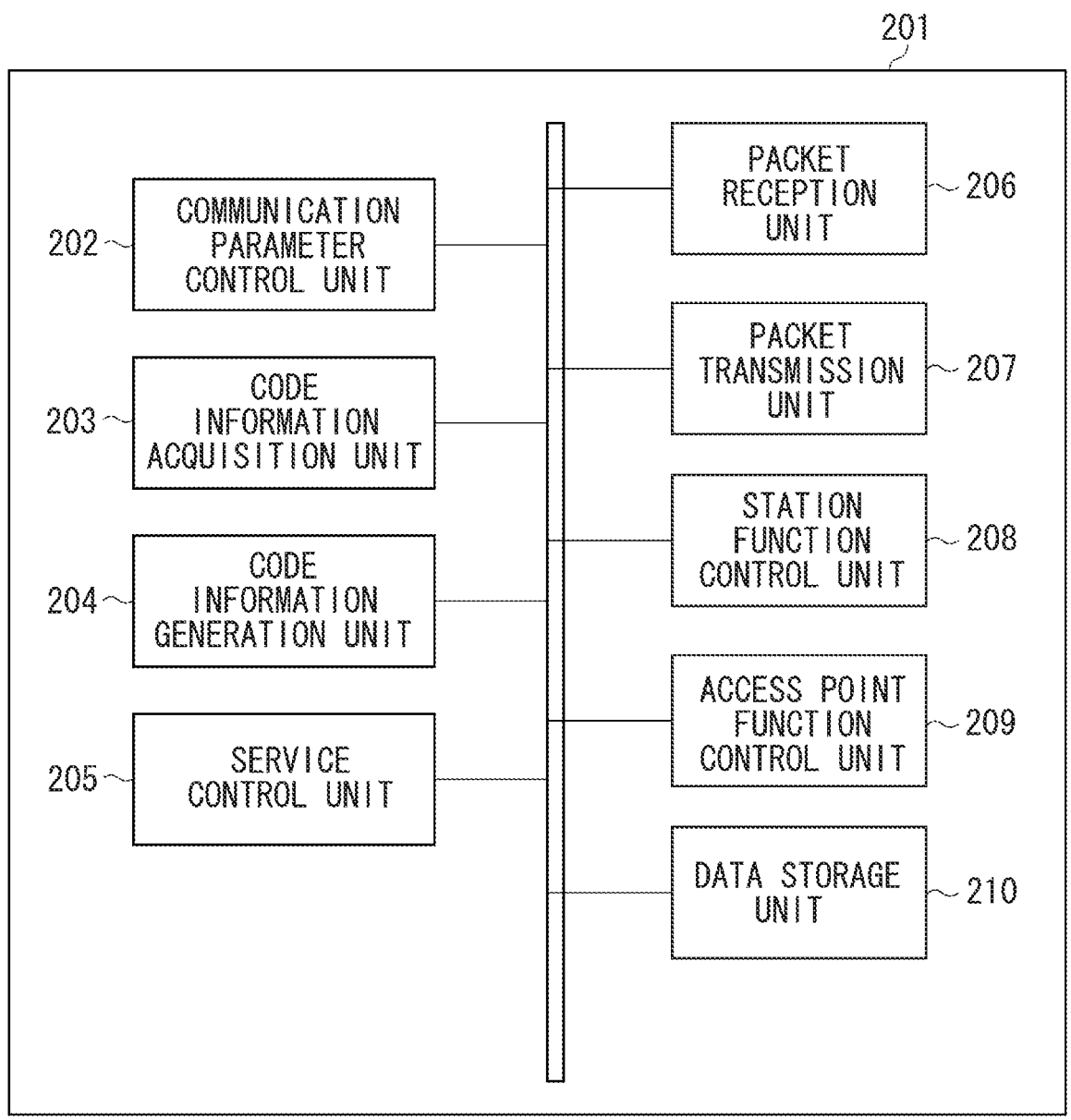
FIG. 2 is a block diagram illustrating a software configuration of the communication apparatus.

FIG. 2 illustrates software functional blocks that are implemented by the control unit 102 of the communication apparatus 101 reading programs stored in the storage unit 103. The software functional blocks illustrated in FIG. 2 are stored in the storage unit 103 in the form of programs. The control unit 102 executes the programs to realize their functions. According to the control programs, the control unit 102 controls each piece of hardware, and calculates and processes information to realize the functions. A part or all of the functional blocks may be realized as hardware. In the case of the hardware implementation, for example, a predetermined complier is used to generate a dedicated circuit on a field-programmable gate array (FPGA) from the programs for realizing the functional blocks. The generated dedicated circuit can then be used as a hardware module having the function of the software module. Like an FPGA, a gate array circuit may be formed for hardware implementation. A part or all of the functional blocks may be configured, for example, as an application specific integrated circuit (ASIC).

FIG. 2 illustrates an entire software functional block 201. A communication parameter control unit 202 performs communication parameter sharing processing for sharing communication parameters to be used for performing wireless communication between apparatuses. In the communication parameter sharing processing, a providing apparatus provides the communication parameters to be used for performing wireless communication to a reception apparatus. The communication parameters include wireless communication parameters needed to perform wireless communication. Examples include a service set identifier (SSID) serving as a network identifier, an encryption method, an encryption key, a network key, an authentication method, and an authentication key. A media access control (MAC) address serving as identification information unique to the communication apparatus 101, a passphrase, an Internet Protocol (IP) address for performing communication on an IP layer, and information required for higher-layer services can also be included. The communication parameters can include any one or all of the foregoing parameters.

A code information acquisition unit 203 captures an image of code information by using the functional unit 109 (imaging unit) and obtains the captured image. The code information includes such information as a public key used in performing the communication parameter sharing processing and an identifier of the communication apparatus 101. The code information can be a two-dimensional code such as a Communication Platform (CP) code and a QR Code®, or a one-dimensional code such as a barcode. The code information acquisition unit 203 analyzes the captured image of the code information obtained by the imaging to obtain encoded information. In the present exemplary embodiment, the code information can include information used in the communication parameter sharing processing. The information used in the communication parameter sharing processing includes a public key used in authentication processing and the identifier of the communication apparatus 101. The public key is information used to enhance security during the communication parameter sharing processing. The public key can be information such as a certificate and a password. A public key is a type of encryption key used in a public key encryption system. The printer 302 does not necessarily need to include the code information acquisition unit 203.

A code information generation unit 204 generates code information including such information as a public key used in performing the communication parameter sharing processing and the identifier of the communication apparatus 101. The code information can be dynamically generated each time the communication parameter sharing processing is performed. If the communication parameter sharing processing uses static code information, the communication apparatus 101 does not need to include the code information generation unit 204. Examples of the static code information include a sticker or a label attached to a housing of the communication apparatus 101 or included in/attached to the communication apparatus' 101 associated instruction manual. The static code information can also be code information written on packaging associated with the communication apparatus 101, such as a cardboard package used to ship/sell the communication apparatus 101. In other words, the information used in the communication parameter sharing processing can be obtained from a captured image of code information displayed on the communication apparatus 101 or code information corresponding to the communication apparatus 101 located on an instruction manual of the communication apparatus 101.

A service control unit 205 controls services performed on an application layer. As employed herein, the application layer refers to a service provision layer in upper layers at and above the fifth layer of the Open System Interconnection (OSI) reference model. More specifically, the service control unit 205 performs print processing, image streaming processing, and/or file transfer processing by using wireless communication performed by the wireless communication unit 104.

A packet reception unit 206 and a packet transmission unit 207 control transmission and reception of all packets, including packets of communication protocols of the upper layers. The packet reception unit 206 and the packet transmission unit 207 control the wireless communication unit 104 to transmit and receive packets compliant with the IEEE 802.11 standard to and from other communication apparatuses.

A station (STA) function control unit 208 provides an STA function for operating as an STA in the infrastructure mode defined in the IEEE 802.11 standard. An access point (AP) function control unit 209 provides an AP function for operating as an AP in the infrastructure mode defined in the IEEE 802.11 standard. A data storage unit 210 controls writing and reading of software and various types of information to and from the storage unit 103.

Next, an operation of the communication system according to the present exemplary embodiment having the foregoing configuration will be described. In the following description, it is assumed that the smartphone 301 captures an image of code information about the printer 302 and provides communication parameters for constructing the network 303 to the printer 302 by the communication parameter sharing processing based on the information included in the code information. The camera 304 then captures an image of the code information about the printer 302, and provides communication parameters used for private communication between the camera 304 and the printer 302 to the printer 302 by the communication parameter sharing processing based on the information included in the code information.

Figure 4:
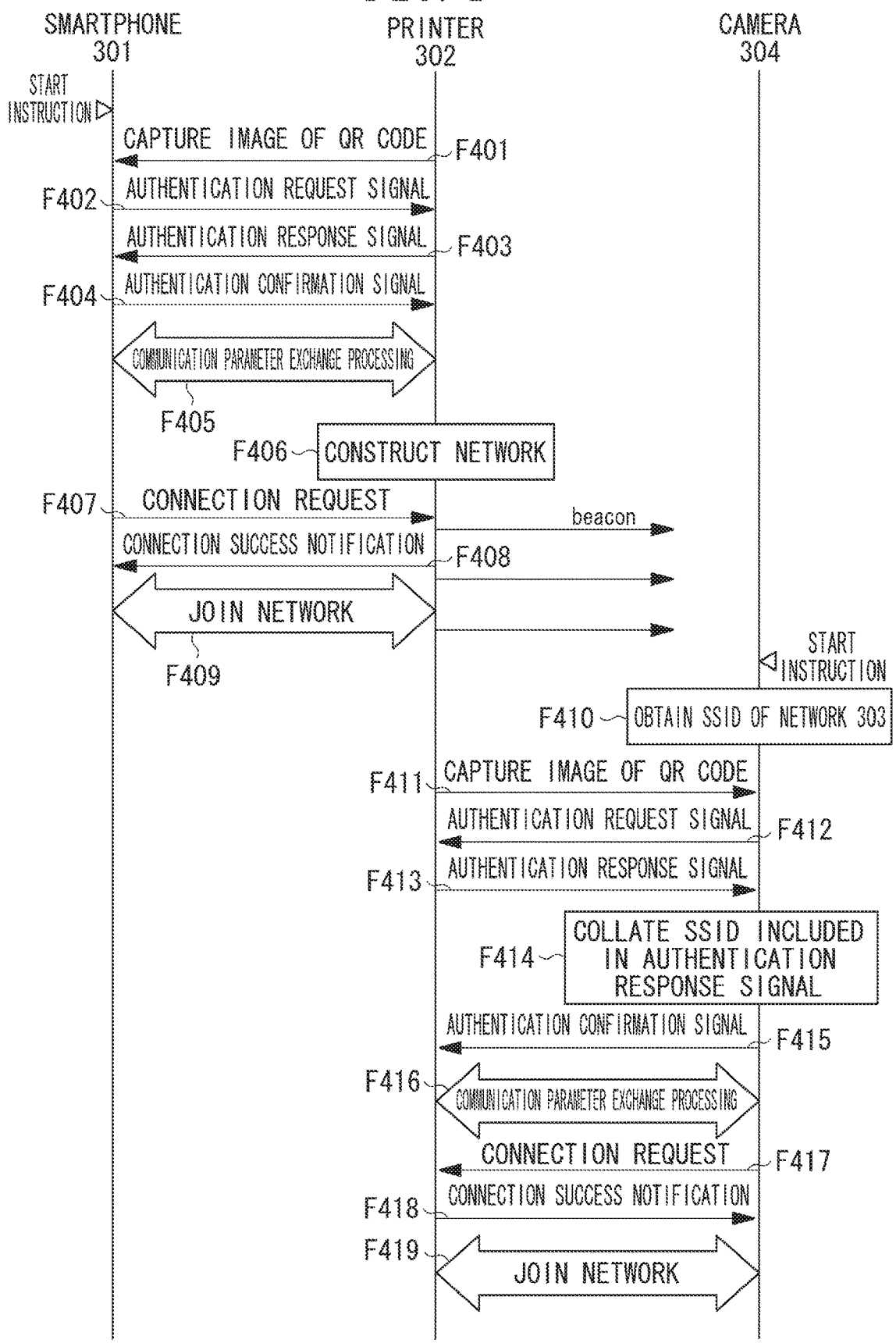
FIG. 4 is a sequence chart of the communication system.

An operation of the communication system according to the present exemplary embodiment will now be described. FIG. 4 illustrates a connection sequence between the communication apparatuses including the smartphone 301, the printer 302, and the camera 304. Initially, in order for the printer 302 to construct the network 303, the smartphone 301 sets the communication parameters to the printer 302.

In FIG. 4, if the user provides an instruction to perform the communication parameter sharing processing from the operation unit 108 to the smartphone 301, the smartphone 301 activates the functional unit 109 (imaging unit). In step F401, the smartphone 301 captures an image of a QR Code® of the printer 302 by using the functional unit 109 (imaging unit), and decodes the QR Code® in the captured image. If the QR Code® captured in step F401 does not include information required for the communication parameter processing, the smartphone 301 can terminate the processing with an error.

While the case where the image of the QR Code® of the printer 302 is captured is described, other code information, such as a one-dimensional code like a barcode and a two-dimensional code like a CP code, can be used. If the user provides an instruction to perform the communication parameter sharing processing from the operation unit 108 to the printer 302, the printer 302 can display the QR Code® used for the communication parameter sharing processing on the display unit 105 or print the QR Code® by using the functional unit 109 (print unit). Alternatively, the QR Code® of the printer 302 can be the one written on a sticker/label attached to the housing of the printer 302 or in an instruction manual of the printer 302. The printer 302 can display, on the display unit 105, a QR Code® including information indicating that the communication parameters are not set or that the network 303 has not been constructed.

The smartphone 301 obtains information used in authentication processing from the QR Code® as information required for the communication parameter sharing processing. The information used in authentication processing includes a public key and the identifier of the communication apparatus (printer 302). For example, the identifier of the communication apparatus can be a MAC address or a universally unique identifier (UUID).

Next, the smartphone 301, based on the information obtained in step F401, performs authentication processing for sharing an encryption key for encrypting the communication parameters with other apparatuses. The smartphone 301 initially obtains authentication information by calculating a hash value for the public key included in the QR Code®. In step F402, the smartphone 301 transmits an authentication request signal including the generated authentication information to the printer 302. The authentication request signal is a signal for requesting the authentication processing.

The authentication request signal uses an action frame defined by the IEEE 802.11 series. However, this is not limited thereto, and an Extensible Authentication Protocol (EAP) signal can be used. Alternatively, other wireless LAN packets can be used. Other than the authentication information, the authentication request signal can include other information used for the authentication processing. Examples include a random number for use in calculating the authentication information, and a public key and an apparatus name of the smartphone 301. The authentication request signal can be unicast by using the identifier of the printer 302 obtained from the QR Code®.

Upon receiving the authentication request signal, the printer 302 performs the authentication processing based on authentication information calculated from the public key of the printer 302 and the authentication information included in the received authentication request signal. The printer 302 determines whether the authentication information included in the received authentication request signal coincides with the calculated authentication information. The printer 302 transmits an authentication response signal indicating whether the authentication processing is successful. The following description deals with the case where the authentication processing is successful. If the authentication information included in the received authentication request signal coincides with the calculated authentication information, the processing proceeds to step F403. In step F403, the printer 302 transmits an authentication response signal indicating that the authentication processing is successful to the smartphone 301. The authentication response signal includes information required for the sender of the authentication request signal to perform authentication processing. For example, the authentication response signal includes information such as an encryption key, authentication information, a public key, and a random number. The authentication response signal also includes information required for generating a common key to be used in encrypting the communication parameters or the common key itself.

The authentication information can be encrypted and communicated for enhanced security. A Diffie-Hellman (DH) key exchange system or a public key encryption system can be used for the encryption.

Upon receiving the authentication response signal, the smartphone 301 performs authentication processing based on the information included in the authentication response signal. Alternatively, the smartphone 301 can perform authentication by determining whether the authentication information included in the received authentication response signal coincides with the authentication information generated based on the information obtained from the QR Code®. The smartphone 301 generates a common key based on the information included in the authentication response signal or obtains the common key from the authentication response signal.

If the authentication processing is successful, the processing proceeds to step F404. In step F404, the smartphone 301 transmits an authentication confirmation signal indicating that the authentication processing is successful to the printer 302. If the authentication processing is successful, the processing proceeds to step F405. In step F405, the smartphone 301 and the printer 302 perform processing for the smartphone 301 to set the communication parameters to the printer 302. As employed herein, such processing will be referred to as communication parameter exchange processing.

More specifically, the printer 302 transmits a setting request signal for requesting the communication parameters to the smartphone 301. Upon receiving the setting request signal, the smartphone 301 transmits a response signal including the communication parameters. The communication parameters are encrypted with the common key shared by the authentication processing. This can enhance security during the provision of the communication parameters.

The smartphone 301 sets communication parameters for defining the network 303 to the printer 302. Examples of the communication parameters for defining the network 303 include an SSID and a basic service set identifier (BSSID) that are identification information about the network 303. The communication parameters for defining the network 303 further include an encryption method used in the network 303. Examples of the encryption method include Wired Equivalent Privacy (WEP), Temporary Key Integrity Protocol (TKIP), and the Advanced Encryption Standard (AES). The communication parameters for defining the network 303 further include an authentication method. Examples of the authentication method include Wi-Fi Protected Access® (WPA™), Wi-Fi Protected Access Pre-Shared Key (WPA-PSK), Wi-Fi Protected Access 2 (WPA2™), and Wi-Fi Protected Access 2 Pre-Shared Key (WPA2-PSK).

The smartphone 301 also sets communication parameters individually used between the smartphone 301 and the printer 302 to the printer 302. Examples of the communication parameters individually used between the communication apparatuses include an encryption key used for unicast communication. The communication parameters individually used between the communication apparatuses further include information such as an authentication key, a pre-shared key, a network key, and a passphrase used for authentication processing for connection. The printer 302 determines whether to authorize a connection according to the authentication processing for connection.

In step F406, the printer 302 constructs the network 303 by using the communication parameters received in step F405. The printer 302 constructs the network 303 by an operation of the access point function control unit 209. The printer 302 also sends out a beacon signal defined in the IEEE 802.11 standard by an operation of the access point function control unit 209. The beacon signal includes at least the SSID and BSSID that are identification information about the network 303. The beacon signal also includes at least a MAC address that is identification information about the printer 302. The beacon signal can include the communication parameters for defining the network 303, such as the encryption method and the authentication method.

In step F407, the smartphone 301 transmits a connection request to the printer 302 for joining the network 303 constructed by the printer 302. If the printer 302 authorizes the smartphone 301 to connect, the processing proceeds to step F408. In step F408, the printer 302 transmits a connection success notification to the smartphone 301. In step F409, the smartphone 301 receives the connection success notification and thereby enters a state of joining the network 303 constructed by the printer 302. The printer 302 performs the authentication processing for determining whether to authorize the connection based on the information received from the smartphone 301 in step F405.

Next, a case where the camera 304 performs the communication parameter sharing processing to be able to join the network 303 will be described. If the camera 304 receives an instruction to join the network 303 via the operation unit 108, the processing proceeds to step F410. In step F410, the camera 304 performs processing for obtaining the communication parameters for defining the network to join, such as the SSID of the network 303. In FIG. 4, the camera 304 receives the beacon signal of the printer 302 and obtains the SSID of the network 303 from the received beacon signal. In step F410, the camera 304 can obtain the SSID by active scan, which includes transmitting a probe request and receiving a probe response. If SSIDs of a plurality of networks are obtained, the camera 304 can obtain an SSID selected by the user via the operation unit 108 as the SSID of the network to join. The camera 304 activates the functional unit 109 (imaging unit) according to a user operation.

If the user provides an instruction to perform the communication parameter sharing processing from the operation unit 108 to the printer 302, the printer 302 can display the QR Code® used for the communication parameter sharing processing on the display unit 105 or print the QR Code® by using the functional unit 109 (print unit). The QR Code® of the printer 302 can be the one written on a sticker/label attached to the housing of the printer 302 or in the printer's 302 instruction manual. The printer 302 can display, on the display unit 105, a QR Code® including information indicating that the communication parameters are already set, or that the network 303 has been constructed.

In step F411, the camera 304 captures an image of the QR Code® of the printer 302. In steps F412 and F413, similar to steps F402 and F403, the camera 304 and the printer 302 perform authentication processing based on the information obtained from the QR Code® to exchange an authentication request signal and an authentication response signal. The printer 302 can include the information indicating that the communication parameters are already set or that the network 303 has been constructed into the authentication response signal exchanged in the authentication processing. If the camera 304 receives the authentication response signal from the printer 302, the processing proceeds to step F414. In step F414, the camera 304 collates the SSID included in the received authentication response signal with the SSID obtained in step F410. In other words, the camera 304 identifies the other party of connection based on the collation of communication parameters such as the SSID included in the authentication response signal. If the camera 304 obtains other communication parameters for defining the network 303 in step F410, such as the encryption method and the authentication method, then in step F414, the camera 304 can similarly collate such communication parameters with the communication parameters included in the received authentication response signal.

If the SSID included in the received authentication response signal does not coincide with the SSID obtained in step F410, the camera 304 determines that the other party of the authentication processing is not an AP that forms the network 303 to join. In such a case, the camera 304 can terminate the authentication processing with an error.

If the SSID included in the received authentication response signal coincides with the SSID obtained in step F410, the camera 304 determines whether the authentication processing is successful. If the authentication processing is successful, the processing proceeds to step F415. In step F415, the camera 304 transmits an authentication confirmation signal indicating that the authentication processing is successful to the printer 302.

If the printer 302 receives the authentication confirmation signal, the processing proceeds to step F416. In step F416, the printer 302 and the camera 304 perform the communication parameter exchange processing. More specifically, the printer 302 transmits a setting request signal for requesting communication parameters, to the camera 304. Upon receiving the setting request signal, the camera 304 transmits a response signal including the communication parameters. The communication parameters are encrypted with the common key shared by the authentication processing. This can enhance security during the provision of the communication parameters.

The camera 304 sets communication parameters individually used between the camera 304 and the printer 302 to the printer 302. Examples of the communication parameters individually used between the communication apparatuses include an encryption key used for unicast communication. The communication parameters individually used between the communication apparatuses also include information such as an authentication key, a pre-shared common key, a network key, and a passphrase that are used for authentication processing for connection. The encryption key individually used between the camera 304 and the printer 302 can be generated in the authentication processing for connection.

The camera 304 does not set new communication parameters for defining a network to the printer 302. The reason is that the printer 302 has already constructed the network 303. If the communication parameters for defining the network 303 are changed, the other terminal currently in connection (in the example in FIG. 4, the smartphone 301) becomes unable to communicate.

The camera 304 can obtain the communication parameters for defining the network 303, such as the SSID, BSSID, encryption method, and authentication method, from the beacon signal obtained from the printer 302. In step F416, the camera 304 can transmit to the printer 302 the communication parameters for defining the network 303, which are obtained from the printer 302 to the printer 302. In step F416, the camera 304 can transmit communication parameters not including the communication parameters for defining the network 303 to the printer 302.

In step F416, the camera 304 can transmit to the printer 302 communication parameters for temporarily connecting to the printer 302. The printer 302 then constructs a network based on the communication parameters for temporary connection, which are received from the camera 304. The printer 302 can then transmit the communication parameters for connecting to the network 303 via the network based on the communication parameters for temporary connection. After the transmission of the communication parameters for connecting to the network 303 via the network based on the communication parameters for temporary connection, the printer 302 can construct the network 303 again and wait for a connection from the camera 304.

After the end of the processing in step F416, in step F417, the camera 304 transmits a connection request to the printer 302 for joining the network 303 constructed by the printer 302. At that time, the camera 304 performs authentication for connecting to the printer 302 by using the authentication key, pre-shared common key, network key, and/or passphrase transmitted in step F416. If the printer 302 succeeds in authentication for connection and authorizes the camera 304 to connect, the processing proceeds to step F418. In step F418, the printer 302 transmits a connection success notification to the camera 304.

After the connection request and the connection success notification in steps F417 and F418, the processing proceeds to step F419. In step F419, the camera 304 joins the network 303 constructed by the printer 302. The camera 304 performs encrypted communication based on the communication parameters to be used individually, which are provided in step F417, with the printer 302 over the network 303. In such a manner, the camera 304 can capture an image of the QR Code® of the printer 302 that has already formed the network 303 and does not have an imaging function, and transmit the information for connecting to the encrypted network 303 to the printer 302 by using the encryption information included in the QR Code®. The camera 304 does not set new communication parameters to be used in the entire network 303, and sets the communication parameters individually used between the camera 304 and the printer 302 to the printer 302. The camera 304 can thus be securely connected to the existing network 303 by a simple operation of capturing an image of the QR Code® without changing the existing network 303 or making complicated input.

Figure 5:
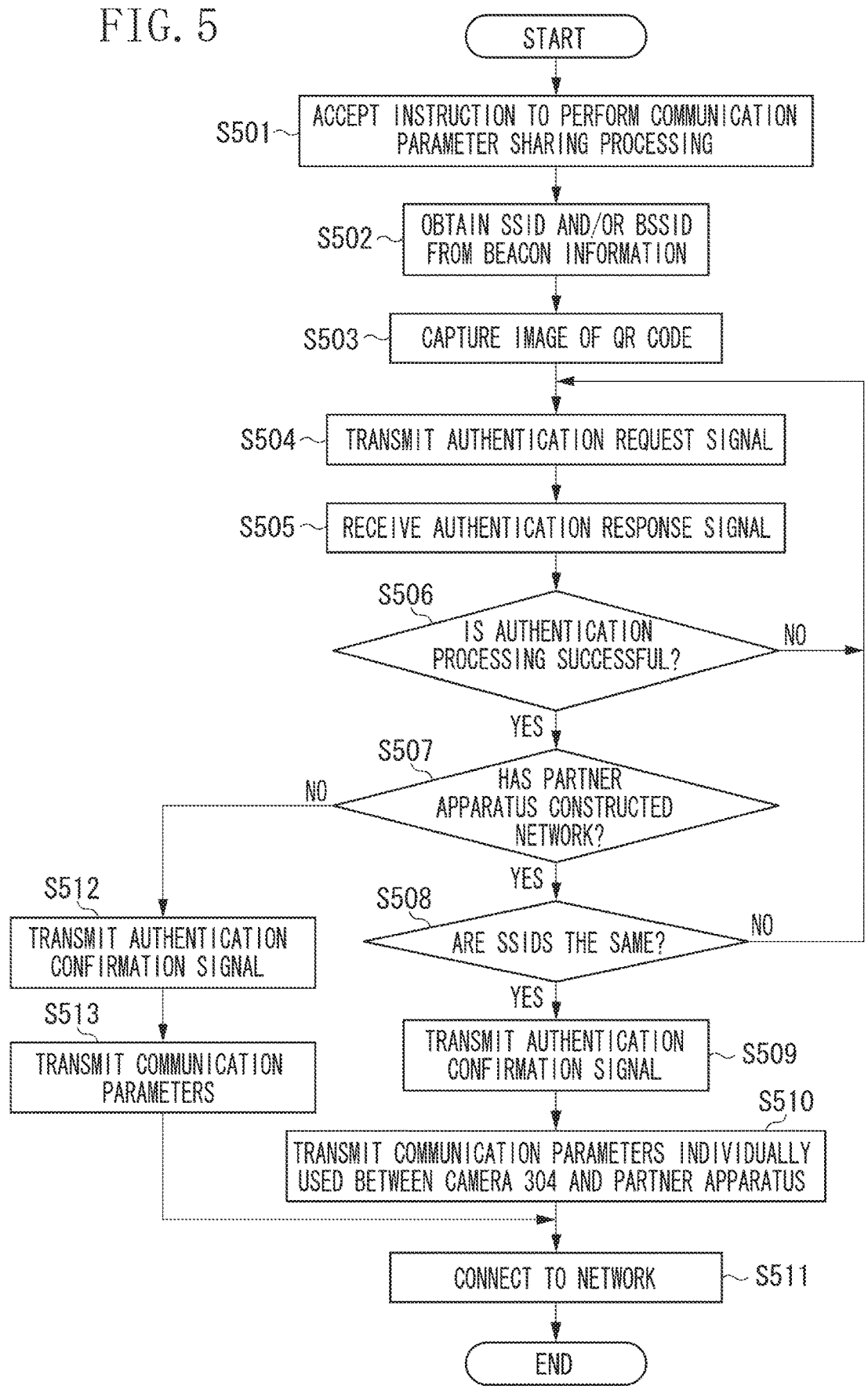
FIG. 5 is an operation flowchart of a camera.

Next, a processing flow performed by the camera 304 will be described with reference to FIG. 5. FIG. 5 is a flowchart illustrating the processing performed by the camera 304. The steps of the flowchart are performed by the control unit 102 executing the control program stored in the storage unit 103 of the camera 304. A part or all of the steps illustrated in the flowchart in FIG. 5 can be implemented by hardware such as an ASIC.

The flowchart in FIG. 5 starts when the camera 304 accepts an instruction to perform the communication parameter sharing processing from a user via the operation unit 108 of the camera 304 in step S501. The camera 304 activates the functional unit 109 (imaging unit) according to the instruction from the user.

The camera 304 activates a communication parameter setting application according to the user's operation on the operation unit 108. The activation of the communication parameter setting application starts a communication parameter setting mode. In step S502, the camera 304 obtains at least either one or both of the SSID and BSSID of the network 303 from beacon information (beacon signal). The camera 304 can obtain the communication parameters for defining the network 303, such as the encryption method and the authentication method, from the beacon information. The camera 304 can perform the operation in step S502 by active scan or passive scan for searching for the network 303.

In step S503, the camera 304 captures an image of the QR Code®. In step S503, the camera 304 can capture an image of code information such as a one-dimensional code such as a barcode and a two-dimensional code other than the QR Code®. In step S503, the camera 304 captures the image of the QR Code® by using the functional unit 109 (imaging unit), and decodes the QR Code® based on the captured image. If the QR Code® obtained in step S503 does not include information required for the communication parameter sharing processing, the camera 304 can terminate the processing with an error.

The camera 304 obtains the public key, which is the encryption information for encrypting the communication parameters, from the QR Code®. Instead of capturing an image of the QR Code®, the camera 304 can obtain the information required for the communication parameter sharing processing by using NFC or another wireless communication method.

Next, the camera 304 calculates a hash value from the public key to generate authentication information, and performs authentication processing for generating a common key for encrypting the communication parameters. In step S504, the camera 304 transmits an authentication request signal including the authentication information. In this case, the camera 304 can broadcast the authentication request signal. If the QR Code® captured in step S503 includes identification information about a communication apparatus, the camera 304 can unicast the authentication request signal to the communication apparatus specified by the identification information.

The camera 304 waits for an authentication response signal. In step S505, if the camera 304 receives an authentication response signal, the processing proceeds to step S506. In step S506, the camera 304 determines whether the authentication processing is successful, based on the authentication information included in the authentication response signal. If the authentication processing is not successful (NO in step S506), the processing proceeds to step S504. The camera 304 then performs the processing in step S504 and the subsequent steps again. If the authentication processing is not successful (NO in step S506), the camera 304 can transmit an authentication confirmation signal indicating that the authentication processing is not successful. If the authentication processing is not successful (NO in step 3506), the camera 304 can display an error message and the processing can terminate.

If the authentication processing is successful (YES in step S506), the processing proceeds to step S507. In step S507, the camera 304 determines whether the partner apparatus of the authentication processing has constructed a network. In other words, the camera 304 determines whether the partner apparatus of the authentication processing has set communication parameters for defining a network. The determination in step S507 can be performed based on the information included in the QR Code® captured in step S503. For example, if the QR Code® captured in step S503 includes information indicating that the network 303 has been constructed, the camera 304 determines that the partner apparatus of the authentication processing has constructed a network.

If the QR Code® captured in step S503 does not include the information indicating that the network 303 has been constructed, the camera 304 determines that the partner apparatus of the authentication processing has not constructed a network. The determination in step S507 can be performed based on the information obtained in step S502. If the sender of the information obtained in step S502 and the partner apparatus of the authentication processing are the same, the camera 304 determines that the partner apparatus of the authentication processing has constructed a network. If the sender of the information obtained in step S502 and the partner apparatus of the authentication processing are not the same, the camera 304 determines that the partner apparatus of the authentication processing has not constructed a network. The determination in step S507 can be performed based on the information received in step S505.

In step S507, if the partner apparatus of the authentication processing is determined not to have set communication parameters for defining a network (NO in step S507), the processing proceeds to step S512. In step S512, the camera 304 transmits an authentication confirmation signal indicating that the authentication processing is successful to the partner apparatus of the authentication processing. In step S513, the camera 304 transmits the communication parameters for defining the network. Then, the processing proceeds to step S511. In step S511, the camera 304 connects to the network indicated by the communication parameters. If, in step S507, the partner apparatus of the authentication processing is determined to have set communication parameters for defining a network (YES in step S507), the processing proceeds to step S508. In step S508, the camera 304 collates the SSID included in the authentication response signal with the SSID obtained in step S502. If other communication parameters for defining a network, such as an encryption method and an authentication method, are also obtained, the camera 304 can similarly collate such communication parameters with those included in the received authentication response signal.

If the SSID included in the authentication signal and the SSID obtained in step S502 are not the same (NO in step S508), the processing proceeds to step S504. The camera 304 then performs the processing in step S504 and the subsequent steps again. If the SSID included in the authentication response signal and the SSID obtained in step S502 are not the same (NO in step 3508), the camera 304 can transmit an authentication confirmation signal indicating that the authentication processing is not successful. If the SSID included in the authentication response signal and the SSID obtained in step S502 are not the same (NO in step S508), the camera 304 can display an error message and terminate the processing.

If the SSID included in the authentication response signal and the SSID obtained in step S502 are the same (YES in step S508), the processing proceeds to step S509. In step S509, the camera 304 transmits an authentication confirmation signal indicating that the authentication processing is successful to the partner apparatus of the authentication processing. In step S510, the camera 304 serves as a providing apparatus for providing communication parameters, and transmits communication parameters individually used between the camera 304 and the partner apparatus to the partner apparatus. Such communication parameters include an encryption key for unicast communication and information used for authentication processing for connection.

In step S511, the camera 304 connects to the network 303 by using the information used for the authentication processing for connection, transmitted in step S510, and performs communication over the connected network based on the encryption key for unicast communication. The camera 304 can perform a four-way handshake based on the information used for the authentication processing for connection or the encryption key transmitted in step S510 to generate another encryption key for performing communication on the network 303.

In such a manner, even if the communication apparatus that forms a network does not have an imaging function, the communication apparatus can construct a new network and let other communication apparatuses join the network.

In the foregoing description, the case is described where the camera 304 provides the communication parameters to be used individually, such as those used for the authentication processing for connection, to the printer 302. However, the communication parameters for defining the network 303 and the communication parameters used for the authentication processing for connection can be transmitted from the printer 302 to the camera 304 in a state of being encrypted with the common key shared between the communication apparatuses by the authentication processing. The camera 304 can switch whether to provide the communication parameters used for connection processing (authentication processing for connection) to the partner apparatus or receive the communication parameters from the partner apparatus, based on the information exchanged in the authentication processing, such as the authentication request signal, the authentication response signal, and the authentication confirmation signal.

For example, if the information exchanged in the authentication processing specifies that the communication parameters used for the connection processing are provided from the camera 304, the camera 304 provides the communication parameters used for the connection processing, to the partner apparatus. If the information exchanged in the authentication processing does not specify that the communication parameters used for the connection processing are provided from the camera 304, the camera 304 receives the communication parameters from the partner apparatus.

The camera 304 can switch whether to provide the communication parameters used for the connection process-ing to the partner apparatus or receive the communication parameters from the partner apparatus, based on the information included in the captured QR Code®.

For example, if the information included in the captured QR Code® specifies that the communication parameters used for the connection processing are provided from the camera 304, the camera 304 provides the communication parameters used for the connection processing to the partner apparatus. If the information included in the captured QR Code® does not specify that the communication parameters used for the connection processing are provided from the camera 304, the camera 304 receives the communication parameters from the partner apparatus.

Although the camera 304 determines the network to join based on the SSID obtained by wireless communication, other methods can be used. More specifically, the camera 304 can obtain the communication parameters for defining the network 303 from the printer 302 by a method other than wireless communication. For example, the camera 304 can obtain communication parameters for defining a network from a QR Code®, and determine an apparatus or network specified by the information included in the QR Code® as the connection destination. The camera 304 can determine a network or apparatus selected by the user as the connection destination. In such cases, the processing in steps S502 and S508 can be omitted. If the SSID of the network determined by the information included in the QR Code® or by the user operation is already set in the camera 304, the camera 304 can transmit the communication parameters to be individually used, such as the information used for the authentication processing for connection, to the printer 302. If the SSID of the network determined by the information included in the QR Code® or by the user operation is not set in the camera 304, the camera 304 can receive all the communication parameters from the printer 302. In such a case, the communication parameters that the printer 302 transmits to the camera 304 include the communication parameters to be individually used and the communication parameters for defining the network, including the SSID.

In the foregoing description, the case is described where the camera 304 determines whether the partner apparatus of the authentication processing has constructed a network, and switches whether to provide the communication parameters used for the connection processing to the partner apparatus or receive the communication parameters from the partner apparatus. However, even if a network has already been constructed, the camera 304 can re-set another network depending on the user's intension and a state of the connected apparatuses.

For example, the printer 302 adds information that the communication parameters of the own apparatus can be changed to the information exchanged in the authentication processing. If the camera 304 receives such information, the camera 304 provides all the communication parameters used for the connection processing to the partner apparatus.

Next, the processing performed by the printer 302 will be described with reference to the flowchart in FIG. 6. The steps of the flowchart are performed by the control unit 102 executing the control program stored in the storage unit 103 of the printer 302. A part or all of the steps illustrated in the flowchart in FIG. 6 can be implemented by hardware such as an ASIC.

Figure 6:
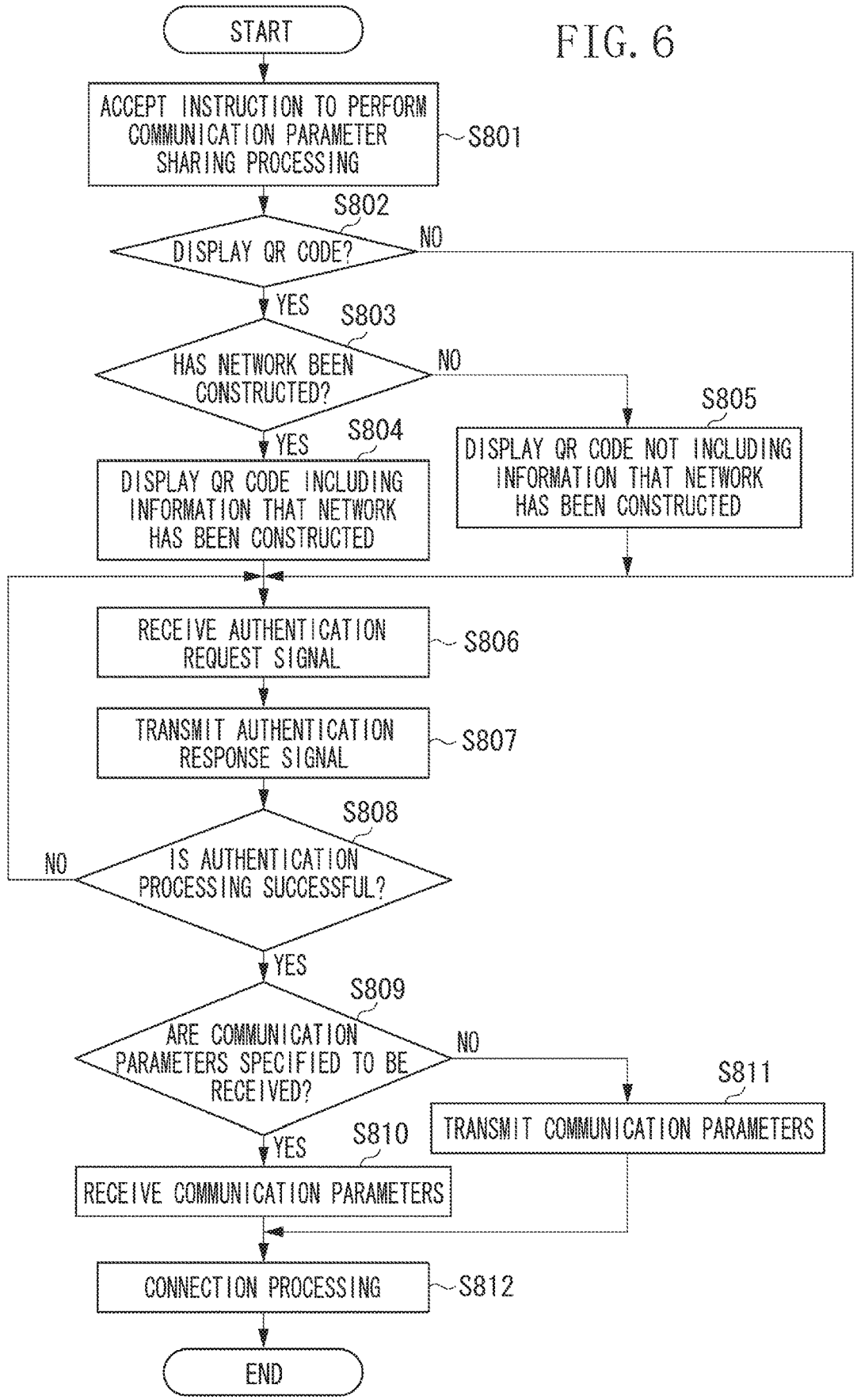
FIG. 6 is an operation flowchart of a printer.

The flowchart in FIG. 6 starts when the printer 302 accepts an instruction to perform the communication parameter sharing processing from the user via the operation unit 108 in step S801. The printer 302 actives a communication parameter setting application according to a user's operation on the operation unit 108. The activation of the communication parameter setting application starts a communication parameter setting mode. In step S802, the printer 302 determines whether to display a QR Code® that includes the information required for the communication parameter sharing processing.

If the QR Code® is determined to be displayed (YES in step S802), the processing proceeds to step S803. In step S803, the printer 302 determines whether the printer 302 as an AP has constructed the network 303. If the printer 302 as an AP has constructed the network 303 (YES in step S803), the processing proceeds to step S804. In step S804, the printer 302 displays a QR Code® that includes the information required for the communication parameter sharing processing and information indicating that the network 303 has been constructed. In step S804, the printer 302 can display a QR Code® including the SSID of the constructed network 303. If the printer 302 as an AP has not constructed the network 303 (NO in step S803), the processing proceeds to step S805. In step S805, the printer 302 displays a QR Code® that includes the information required for the communication parameter sharing processing, but not the information indicating that the network 303 has been constructed. The QR Code® displayed in step S804 or S805 can be printed by the functional unit (print unit) 109. The QR code displayed in step S804 or S805 can be stored in an NFC tag and communicated by using NFC.

In step 3802, if the QR Code® is determined not to be displayed (NO in step S802), the processing proceeds to step S806. In such a case, the communication parameter sharing processing uses a QR Code® written on a sticker/label attached to the housing of the printer 302 or in the printer's 302 instruction manual. If the printer 302 does not have the function of displaying or printing a QR Code®, the processing in steps S802 to S805 can be omitted.

The printer 302 then waits for an authentication request signal. In step S806, the printer 302 receives an authentication request signal, and obtains authentication information included in the received authentication request signal. The printer 302 determines whether the authentication information included in the received authentication request signal coincides with authentication information generated from the public key stored in the storage unit 103 of the printer 302, and determines whether the authentication processing is successful. In step S807, the printer 302 transmits an authentication response signal including the authentication information generated from the public key stored in the storage unit 103 of the printer 302. If the printer 302 has constructed the network 303, the printer 302 can transmit an authentication response signal including the communication parameters for defining the network 303, such as the SSID of the network 303. If the printer 302 has displayed the QR Code® including the SSID of the network 303 on the display unit 105, the printer 302 can transmit the authentication response signal without the SSID. If the printer 303 has displayed the QR Code® not including the SSID of the network 303 on the display unit 105, the printer 302 can transmit the authentication response signal with the SSID included.

In step S808, the printer 302 receives an authentication confirmation signal from the partner apparatus and determines whether the authentication processing is successful. If the authentication processing is determined to be unsuccessful (NO in step 3808), the processing returns to step S806. The printer 302 then performs the processing of step S806 and subsequent steps again. If the authentication processing is determined to be successful (YES in step S808), the processing proceeds to step S809. In step S809, the printer 302 determines a transfer direction of communication parameters. The determination in step S809 can be performed based on the information exchanged in the authentication processing, such as the authentication request signal, the authentication response signal, and the authentication confirmation signal.

For example, if the information exchanged in the authentication processing specifies that the communication parameters used for the connection processing are received from the partner apparatus (YES in step S809), the processing proceeds to step 3810. If the information exchanged in the authentication processing does not specify the communication parameters used for the connection processing are received from the partner apparatus (NO in step S809), the processing proceeds to step S811.

The determination in step S809 can be performed based on the information included in the QR Code® displayed by the printer 302. For example, if the information included in the QR Code® specifies that the communication parameters used for the connection processing are received from the partner apparatus (YES in step S809), the processing proceeds to step S810. If the information included in the QR Code® does not specify that the communication parameters used for the connection processing are received from the partner apparatus (NO in step S809), the processing proceeds to step S811.

The determination in step S809 can be performed based on capability information about the capability to operate as a communication parameter providing apparatus or information equivalent to an intent value according to Wi-Fi Direct®. Such information is included in the information exchanged in the authentication processing.

The processing in step S809 can be omitted to perform the processing of either step S810 or S811. If the printer 302 has not constructed the network 303, the processing in step 3809 can be omitted to perform the processing in step 3810.

If the printer 302 is to receive the communication parameters (YES in step S809), the processing proceeds to step S810. In step 3810, the printer 302 receives the communication parameters from the partner apparatus. If the printer 302 has constructed the network 303, the printer 302 receives the communication parameters individually used with the partner apparatus, such as the communication parameters used for the connection processing and an encryption key used for unicast communication. If the printer 302 has constructed the network 303 and receives an SSID different from that of the constructed network 303 in step S810, the printer 302 discards the received SSID and does not form a network of that SSID. If the printer 302 has not constructed the network 303, the printer 302 receives the communication parameters individually used with the partner apparatus, such as the communication parameters used for the connection processing, and the communication parameters for defining a network, such as an SSID.

If the printer 302 is to transmit the communication parameters (NO in step S809), the processing proceeds to step S811. In step S811, the printer 302 transmits the communication parameters of the constructed network 303 to the partner apparatus. The communication parameters exchanged in steps S810 and S811 are encrypted with the common key, which is shared with the partner apparatus by the authentication processing, for encrypting the communication parameters. After the communication parameters are shared with the partner apparatus by the processing of step S810 or S811, the processing proceeds to step S812. In step S812, the printer 302 performs the connection processing with the partner apparatus.

Even if the network 303 has been constructed, the printer 302 can notify, during the authentication processing performed in steps S806 and S807, the partner apparatus of information that the network 303 can be reconstructed. If the camera 304 is notified of the information that the network 303 can be reconstructed, the camera 304 sets new communication parameters to the printer 302.

As described above, even if a communication apparatus does not have an imaging function and is not capable of obtaining encryption information for encrypting communication parameters included in a QR Code® by imaging, the communication apparatus can create a network and let other communication apparatuses join the network.

The camera 304 can capture an image of the QR Code® of the printer 302, which has already formed the network 303 and does not have an imaging function, and transmit information for connecting to the encrypted network 303 to the printer 302 by using the encryption information included in the QR Code®. The camera 304 does not set new communication parameters used in the entire network 303, and sets communication parameters individually used between the camera 304 and the printer 302 to the printer 302. Therefore, the camera 304 can be securely connected to the existing network 303 by a simple operation of capturing an image of the QR Code® without changing the existing network 303 or making complicated input.

The printer 302 provides the communication parameters for defining the network 303, which are relatively less relevant to security, to the camera 304 by using a beacon signal. The printer 302 exchanges communication parameters relatively relevant to security, such as the information used for the authentication processing for connection and the encryption key, in a state of being encrypted with the common key shared by the authentication processing based on the information included in the code information. The communication parameters relevant to security can thus be exchanged in the encrypted state even between the apparatus that has already constructed a network and is not capable of obtaining encryption information for encrypting the communication parameters included in a QR Code® and other apparatuses.

As described above, even if the apparatus that forms a network does not have an imaging function, the information for connecting to the network can be shared between apparatuses by using encryption information expressed by code information.

Other Embodiments

In the foregoing exemplary embodiment, the information required for the communication parameter sharing processing can be exchanged by using NFC, Bluetooth®, ZigBee, and/or TransferJet® communications. For example, the information required for the communication parameter sharing processing can be exchanged by NFC, and the communication parameters can be provided by communications compliant with the IEEE 802.11 series standard.

An exemplary embodiment can be implemented by processing for supplying a program that implements one or more of the functions of the foregoing exemplary embodiment to a system or an apparatus via a network or a storage medium, and reading and executing the program by one or more processors of a computer of the system or apparatus. An exemplary embodiment can be implemented by a circuit, e.g., ASIC that implements one or more of the functions.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-012863, filed Jan. 26, 2016, which is hereby incorporated by reference herein in its entirety.

What is claimed is:
1. A communication apparatus comprising:
one or more processors; and
one or more memories including instructions that, when executed by the one or more processors, cause the communication apparatus to:
communicate first communication parameters including a first network identifier and a first encryption key with a first other communication apparatus;
form a wireless network having the first network identifier;
provide second communication parameters including the first network identifier to a second other communication apparatus;
communicate, in a case where the communication apparatus provides the second communication parameters, third communication parameters including the first network identifier and a second encryption key with the second other communication apparatus, by performing communication for authentication processing using encryption information acquired from a captured image captured by the second other communication apparatus; and
connect the first other communication apparatus to the wireless network based on the first communication parameters, and connect the second other communica- tion apparatus to the wireless network based on the third communication parameters.

2. The communication apparatus according to claim 1, wherein the one or more processors cause the communication apparatus to display code information which comprises the encryption information.

3. The communication apparatus according to claim 1, wherein the second encryption key is an encryption key used for unicast communication.

4. The communication apparatus according to claim 1, wherein the encryption information is a public key.

5. The communication apparatus according to claim 1, wherein the captured image is a one-dimensional code or a two-dimensional code.

6. The communication apparatus according to claim 1, wherein the captured image is a Quick Response Code® (QR Code®) or a barcode.

7. The communication apparatus according to claim 1, wherein the communication apparatus forms the wireless network by operating as an access point.

8. A communication method comprising:

communicating, by the first communication apparatus, first communication parameters including a first network identifier and a first encryption key with a first other communication apparatus;

forming, by a first communication apparatus, a wireless network having the first network identifier;

providing, by the first communication apparatus to a second other communication apparatus, second communication parameters including the first network identifier;

communicating, by the first communication apparatus to the second other communication apparatus, in a case where the first communication apparatus provides the second communication parameters, third communication parameters including the first network identifier and a second encryption key with the second other communication apparatus, by performing communication for authentication processing using encryption information acquired from a captured image captured by the second other communication apparatus; and connecting, by the first communication apparatus, the first other communication apparatus to the wireless network based on the first communication parameters, and connecting the second other communication apparatus to the wireless network based on the third communication parameters.

9. A non-transitory computer-readable storage medium storing instructions for causing a computer to execute a communication method, the communication method comprising:

Communicating, by the first communication apparatus, first communication parameters including a first network identifier and a first encryption key with a first other communication apparatus;

forming, by a first communication apparatus, a wireless network having the first network identifier providing, by the first communication apparatus to a second other communication apparatus, second communication parameters including the first network identifier;

communicating, by the first communication apparatus to the second other communication apparatus, in a case where the first communication apparatus provides the second communication parameters, third communication parameters including the first network identifier and a second encryption key with the second other communication apparatus, by performing communication for authentication processing using encryption information acquired from a captured image captured by the second other communication apparatus; and connecting, by the first communication apparatus, the first other communication apparatus to the wireless network based on the first communication parameters, and connecting the second other communication apparatus to the wireless network based on the third communication parameters.

* * * * *